United States Patent [19]

Heidrich

[11] Patent Number: 4,802,882
[45] Date of Patent: Feb. 7, 1989

[54] DIAPHRAGM DISK ASSEMBLY FOR TORQUE TRANSMITTING JOINT AND PROCESS FOR ITS FABRICATION

[75] Inventor: Günther Heidrich, Burgberg, Fed. Rep. of Germany

[73] Assignee: BHS - Bayerische Berg-, Hütten- and Salzwerke AG

[21] Appl. No.: 169,088

[22] Filed: Mar. 17, 1988

Related U.S. Application Data

[63] Continuation of Ser. No. 808,459, Dec. 12, 1985.

[30] Foreign Application Priority Data

Jul. 26, 1985 [EP] European Pat. Off. ........ 85109402.9

[51] Int. Cl.⁴ .............................................. F16D 3/79
[52] U.S. Cl. ...................................... 464/99; 464/147
[58] Field of Search ................... 464/92, 96, 98, 99, 464/147

[56] References Cited

U.S. PATENT DOCUMENTS

| | | |
|---|---|---|
| 2,793,513 | 5/1957 | Anderson ............................. 464/87 |
| 3,041,857 | 7/1962 | Anderson et al. ................... 464/99 |
| 3,124,942 | 3/1964 | Rothfuss et al. |
| 3,336,764 | 8/1967 | Chambers ............................ 464/99 |
| 3,543,537 | 12/1970 | Rothfuss et al. ................... 464/99 |
| 3,677,031 | 7/1972 | Zierak et al. ....................... 464/99 |
| 3,959,988 | 6/1976 | McNamee ....................... 464/99 X |
| 4,579,545 | 4/1986 | Chapman ........................ 464/99 X |

FOREIGN PATENT DOCUMENTS

| | | |
|---|---|---|
| 0026681 | 8/1980 | European Pat. Off. . |
| 2041353 | 2/1972 | Fed. Rep. of Germany . |
| 2542946 | 3/1977 | Fed. Rep. of Germany . |
| 2934346 | 8/1980 | Fed. Rep. of Germany . |
| 2148901 | 3/1973 | France . |
| 53-92071 | 8/1978 | Japan ..................................... 464/98 |
| 53401 | 4/1967 | Luxembourg . |
| 0484376 | 2/1970 | Switzerland . |
| 685466 | 1/1953 | United Kingdom .................. 464/99 |
| 1091121 | 2/1965 | United Kingdom . |

OTHER PUBLICATIONS

Magazine article from "Product Engineering" Jun. 1977, pp. 33-35.
Brochure from the Bendix Company entitled "Contoured Flexible Diaphragm Coupling" date unknown.
Article from BDS-Fachbuchreihe, vol. 12, "Schweissen und Schneiden", pp. 46-49, date unknown.

Primary Examiner—Daniel P. Stodola
Attorney, Agent, or Firm—Toren, McGeady & Associates

[57] ABSTRACT

An elastic coupling for a torque transmitting joint formed of a pair of diaphragm disks which have a pair of opposed radial contact faces extending essentially at right angles to the axis of the disk and a pair of essentially cylindrical centering faces at the radially innermost terminations of the contact faces is formed with an annular disk-shaped electron beam welding zone which welds the contact faces together and which extends radially from the outermost peripheries of the diaphragm disks inwardly to a point proximate the centering faces.

10 Claims, 5 Drawing Sheets

DIAPHRAGM DISK ASSEMBLY FOR TORQUE TRANSMITTING JOINT AND PROCESS FOR ITS FABRICATION

This is a continuation of application Ser. No. 808,459, filed Dec. 12, 1985.

The present invention is generally directed to torque transmitting devices and more specifically to the construction of an elastic coupling between a pair of torque transmitting members.

In the type of device to which the present invention relates, a pair of diaphragm disks are arranged in torque transmitting engagement with each other and the two concentric diaphragm disks may be formed with contact faces which extend essentially perpendicular to the axis of the torque transmitting joint and which adjoin each other and are connected in their radially outer edge areas. The radially inner edge areas of the diaphragm disks are connected with the individual members of the torque transmission device.

In the prior art, such pairs of diaphragm disks, which also may be supplemented by the joint parts, constitute elastic or diaphragm couplings and an arrangement of such diaphragm disk pairings is known in the prior art from European Publication No. 0 026 681 A 1. In this known diaphragm disk pairing, no statement is made with respect to the type of connection of the diaphragm disks in their radially outer edge areas.

In the case of diaphragm disk pairs, usually, the disks are connected with each other by bolts in their radially outer edge areas as is known, for example, from Swiss Pat. No. 484 376. In this device, the bolts are distributed along the periphery of the outer radial edge areas of the disk and, in this known embodiment, there is required very careful and time consuming assembly procedures, particularly if the assembly is required to transmit very high rpms which may therefore cause imbalances in the torque transmission device.

In another prior art device known from British Pat. No. 1 491 121, it is known to connect in a torque transmission device a diaphragm disk in its outer radial edge area with the outer radial edge area of a key-shaped annular body by means of welding. Here, an edge or rim flange of the key-shaped annular member and an axially oriented annular projection of the diaphragm disk adjoin each other with contact faces perpendicular to the axis. With regard to the welding arrangement, it is stated that this has to be applied to the outer radial side of the axially oriented annular projection. The device of the prior art, therefore, contemplates an annular welding bead which extends over the peripheral faces of the key-shaped annular member, on the one hand, and the axally oriented ring projection of the diaphragm disk on the other hand, and covers the juncture between the contact faces adjoining each other.

In this embodiment which has, to be sure, not been proposed for two diaphragm disks, but only for a combination of one diaphragm disk with a key-shaped annular member, the strengths of the welding seam are not considered secure since it must be anticipated that types of stresses which are very difficult to estimate and which are aggressive for the welding connection will occur.

Another prior art publication appears in "Product Engineering" and comprises a paper entitled "Diaphragm Couplings Challenge Disk and Gear Types for High Torque", published in June 1977. From this publication, it is known to utilize electron beam welding processes in the fabrication of torque transmitting devices incorporating diaphragm disk pairings. It is proposed here to join the diaphragm disks with the hub parts by electron beam welding.

Accordingly, the present invention is directed toward providing an improvement with regard to the structure of torque transmitting couplings involving diaphragm disk pairings and is particularly directed toward the connection which is provided in the outer radial edge areas of the diaphragm disk pairs. The invention is aimed toward providing an arrangement which at least makes the adjustment and balancing problems less difficult to endure and which satisfies the need for high mechanical loading, particularly when they occur at the junction of the outer radial edge areas, if the junction parts connected to the diaphragm disks are positioned with angular stagger or offset or axial parallel stagger or offset with respect to each other.

SUMMARY OF THE INVENTION

In accordance with the invention, there is provided a diaphragm disk assembly for a torque transmitting joint, wherein the contact faces of the diaphragm disks, which contact faces extend perpendicularly to the torque transmitting axis of the joint, are welded together by means of an annular disk-shaped electron beam welding zone which extends from the outer radial periphery of the diaphragm disks radially inwardly up to a pairing of essentially cylindrical centering faces, namely one radially outwardly facing centering face of one of the diaphragm disks and one radially inwardly facing centering face of the other diaphragm disk, or which ends within the material of the diaphragm comprising the outwardly facing radial centering face.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described the preferred embodiments of the invention.

DETAILED DESCRIPTION OF THE PREFERRED EMBODIMENTS

Figure 1:
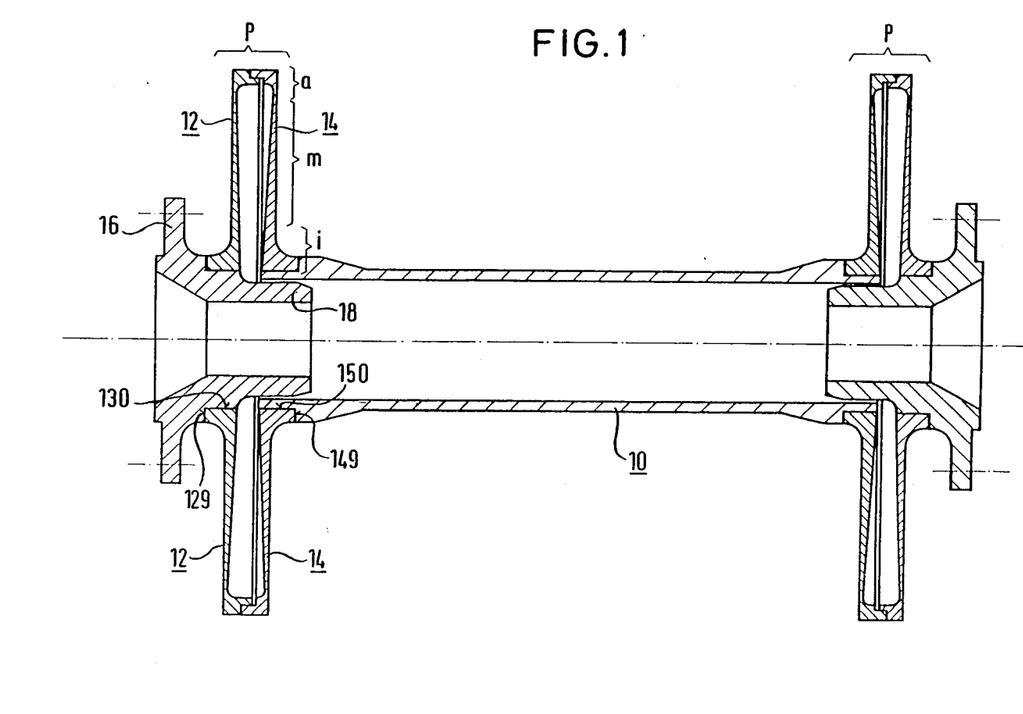
FIG. 1 is a sectional view showing a torque transmitting joint including a diaphragm disk assembly in accordance with the present invention.
Figure 2:
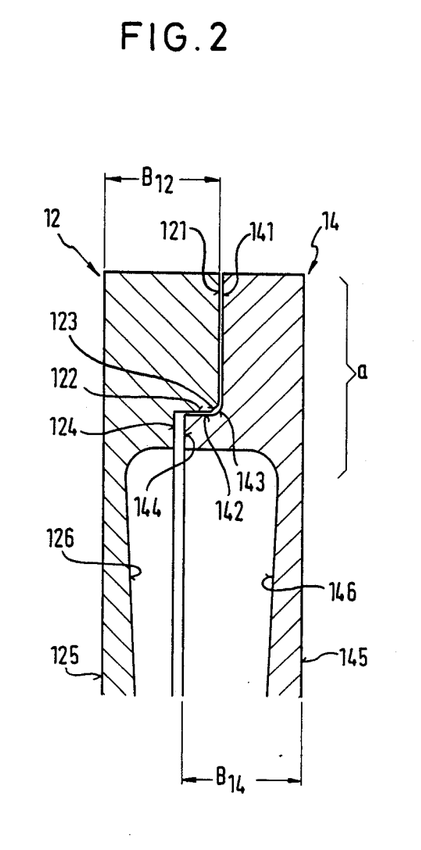
FIG. 2 is a sectional view taken on a somewhat larger scale showing a connecting point between a radially outer edge area of adjoining diaphragm disks prior to the performance of a welding operation.
Figure 3:
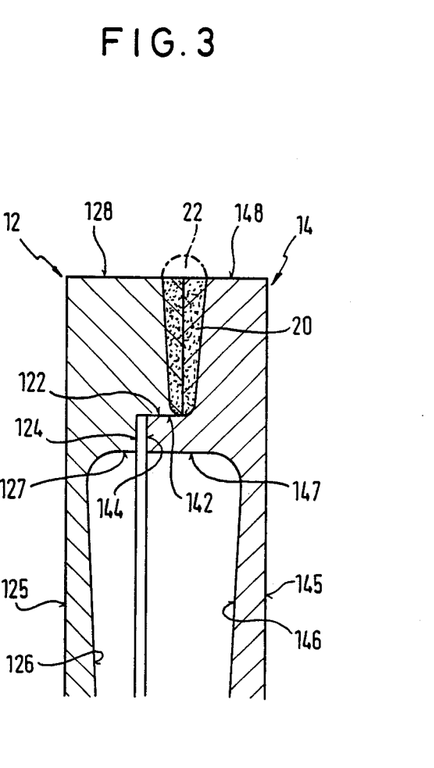
FIG. 3 is a sectional view similar to that of FIG. 2 showing the connecting point after the welding operation has been performed.

Referring now to the drawings and particularly to FIGS. 1-3 wherein there is shown a first embodiment of the invention, the invention is depicted as comprising a torque transmission assembly including a connecting shaft 10 having a pairing P, each consisting of two diaphragm disks attached at opposite ends of the connecting shaft 10 to form a torque transmitting connection between the shaft 10 and a member, such as a shaft joint flange 16. Since the diaphragm disk pairings or assemblies P, two of which are shown in FIG. 1, are identical, the description of one of these pairings will be sufficient for describing the structure of both.

The pairing or diaphragm disk assembly P consists of a pair of diaphragm disks 12 and 14 which are connected with each other in their radially outer edge areas along the entire circumferences of the disks 12 and 14. With regard to the details of structure as to how the outer edge areas are connected, reference should be made to FIGS. 2 and 3.

Referring to FIG. 1, the diaphragm disk 14 is connected with the connecting shaft 10 at its radially inner edge area, for example, by means of electron beam welding. The diaphragm disk 12 is connected with the shaft joint flange 16 with its radially inner edge area, with the flange 16 being fabricated in one piece to comprise a tube extension 18. The tube extension 18 extends into the connecting shaft 10 a sufficient distance so that it may provide a radial support for the connecting shaft 10 in case of fracture which might occur in one of the diaphragm disks 12 or 14 or in the connection between the disks 12, 14 and the shaft joint flange 16 or the connecting shaft 10.

In FIG. 1, the individual radially adjoining annular areas of the diaphragm disks are identified as a, m, i, with a being the radially outer edge area, m being the radially middle area and with i being the radially inner edge area.

In FIG. 2, the diaphragm disks 12 and 14 are shown prior to a welding operation being performed. As shown in FIG. 2, the radially outer edge area a of the two diaphragm disks 12 and 14 is shown in greater detail and the diaphragm disk 14 has formed at its radially outer edge area, a contact face 141, which extends generally perpendicularly to the axis of the torque transmitting joint, and a radially outwardly facing centering face 142. The diaphragm disk 12 is formed with a contact face 121, extending generally perpendicularly to the axis of the joint, and with a radially inwardly facing centering face 122. The radially outer or outwardly facing centering face 142 extends through a transition into the associated contact face 141 through a curved transition portion 143 having a radius of 0.2 mm.

At the transition between the centering face 122 and the contact face 121 on the disk 12, there is provided a bevelled or chamfered portion 123 which is adapted in such a way to the transition curve 143 that the volume enclosed therebetween is minimal and, on the other hand, however, so that the contact faces 121 and 141 will fit snugly together.

As indicated in FIG. 2, the disks 12 and 14 are formed with dimensions which include widths $B_{12}$ and $B_{14}$ in the vicinity of the radially outer edge areas a. As will be seen from FIG. 2, the dimensions $B_{12}$ and $B_{14}$ are equal. As a result, only steps have to be machined into the diaphragm disks 12 and 14 at the blanks whose widths over the entire radially outer edge area a amount to respectively $B_{12}$ or $B_{14}$, in order to obtain the contact faces 121 and 141 as well as the centering faces 122 and 142.

The contact faces 121 and 141, the centering faces 122 and 142 and other faces 124, 144 facing each other in the axial direction are arranged to form a Z-shaped butt joint between the diaphragm disks 12 and 14 in their radially outer area a.

Fabrication of the diaphragm disks 12, 14 occurs preferably from forged blanks by machining. The diaphragm disks 12 and 14 are first provided with flat front faces 125 and 145 extending at right angles to the axis of the joint so that the blanks may be clamped on disks of a lathe (not shown) so that they may be snugly supported in the axial direction. The steps are then machined on the blanks in order to yield the centering faces 122, 142. Furthermore, conically extending front faces 126 and 146, which are arranged in facing relationships, may also be formed on this machine.

The dimensions of the portions of the disks having the faces 126 and 146 are such that the wall thicknesses of the disks increase from radially outwardly to radially inwardly in the radially middle area m of the disks. Turning of the faces 122, 142 and 141, 124 in order to form the steps as well as of the conical front faces 126, 146 may therefore occur without any fear that a springiness of the diaphragm disks may result.

In accordance with FIG. 3, the diaphragm disks 12 and 14 are shown welded together by means of an electron beam welding process, whereby an annular disk-shaped electron beam weld zone 20 is formed in the area of the contact faces 121, 141, with the weld zone reaching radially inwardly to the centering faces 122, 142 or beyond that, however, in any case, radially outwardly from the inner peripheral faces 127, 147 of the diaphragm disks 12, 14 and ending in the material of the diaphragm disk 14. During the welding operation of the two diaphragm disks 12 and 14, a weld bead 22 may be formed at the external peripheral surfaces 128, 148 of the disks 12, 14 which may result in an imbalance if the weld bead 22 is uneven. The weld bead can be turned off on a lathe without impairing the weld itself. If the above-stated welding conditions are observed, it need not occur that during the electron beam operation in the outer peripheral surfaces 128, 148 of the diaphragm disks 12, 14, a depression results in the area of the electron beam welding zone 20.

After having connected the two diaphragm disks 12 and 14, they can be assembled in accordance with FIG. 1 into a torque transmitting joint by the formation of welds in the area of butt joints 129, 149 which extend at right angles to the axis.

On the other hand, it is also possible to first of all weld the diaphragm disks 12 and 14 with the shaft joint flange 16 or the connecting shaft 10 and only thereafter to perform electron beam welding at the weld zone 20. In this case, also, a welding seam in the area of the centering butt joints 130, 150 is possible.

Figure 4:
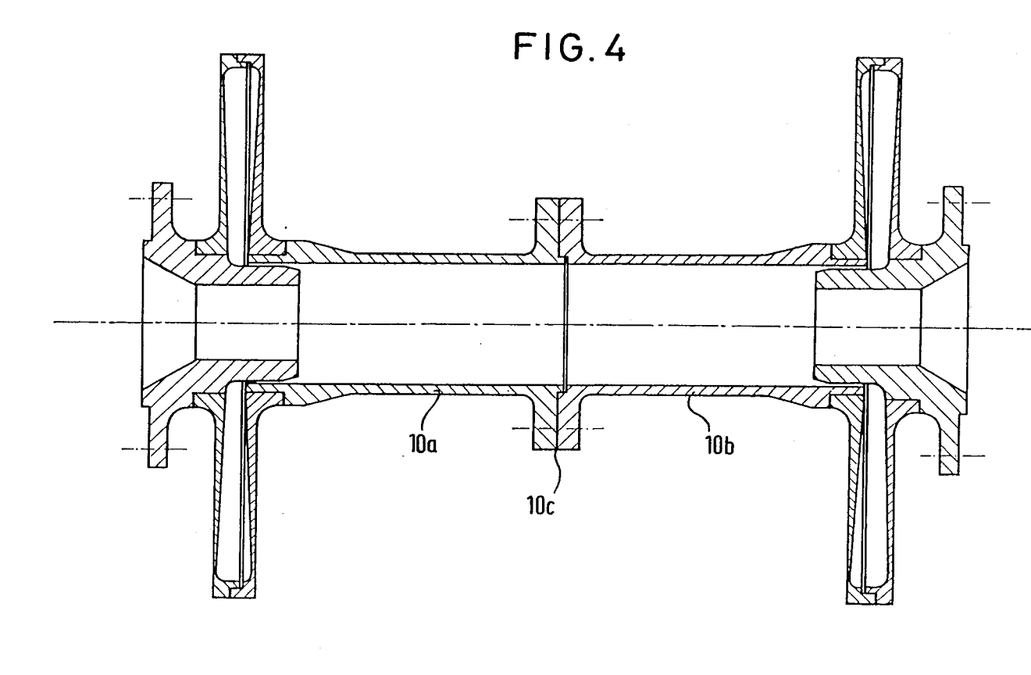
FIGS. 4 and 5 are sectional views, each showing further embodiments of the invention.

A further embodiment of the invention is shown in FIG. 4 which differs from that of FIG. 1 merely in that the connecting shaft 10 is divided into two shaft parts 10a and 10b which are connected to each other by means of a flanged connection 10c.

Figure 5:
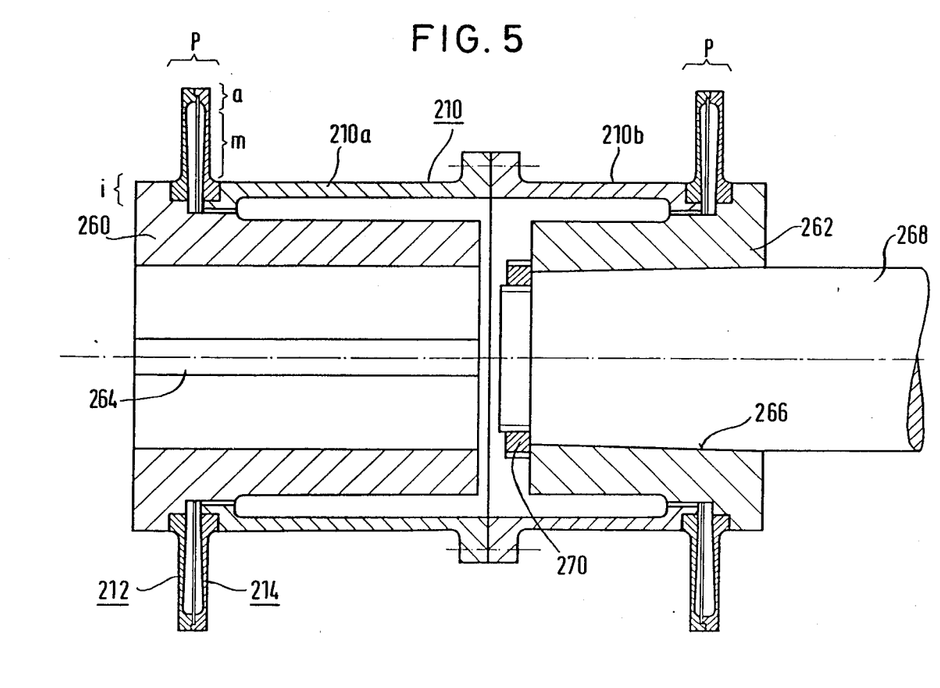

FIG. 5 shows a further embodiment of the invention, wherein analogous parts are identified by similar reference numerals which are increased by a factor of 200 relative to the numerals shown in FIG. 1. The facing diaphragm disks of the two diaphragm disk pairs P, P are connected to each other with a torsional and/or bending flexibly connecting shaft 210 similar to the shaft 10, which is formed from two shaft portions 210a, 210b.

The sides of the disks of the disk pairs P, P facing away from each other are connected with hubs 260 or 262. The hubs 260, 262 extend into the connecting shaft 210 and are arranged with their inner ends spaced a small distance from each other. The hub 260 is provided with a keyway 264 in which there is received a shaft with a key-keyway connection. The hub 262 is provided with an inner conical surface 266 and receives a shaft 268 which is clamped against the hub by means of a nut 270.

In this embodiment, particular advantages are provided because the shafts, of the two machine parts, which have to be connected with each other, of which only the shaft 268 is shown, can be placed in direct proximity to each other and, in spite of that, there exists the possibility of compensating for the angular and parallel stagger of the shafts by means of the diaphragm disk pairs P and the possibly torsional or bending flexural shaft 210.

Figure 3A:
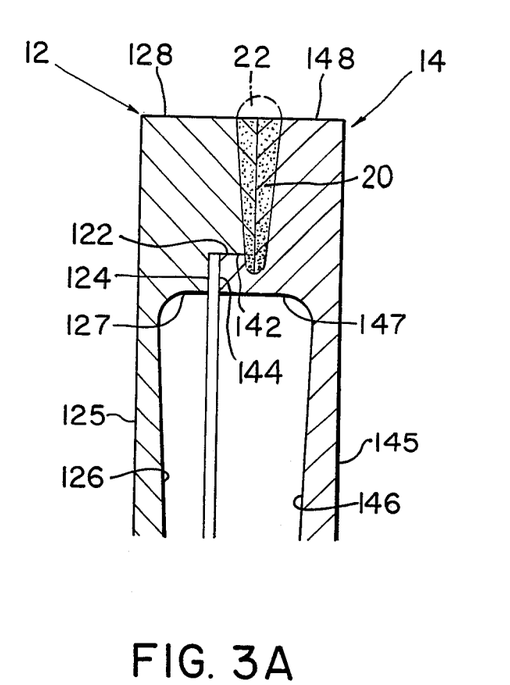
FIG. 3a is a sectional view similar to FIG. 3 but illustrating the weld projecting radially inwardly further than displayed in FIG. 3.

Concerning the design of the annularly disk-shaped electron beam weld zone, it should be additionally stated that it is also protected against corrosion in its radially inner periphery by being bound against the outer centering face 142 (FIG. 2) with its radially inner periphery or having it dip into the material of the diaphragm disk 14, note FIG. 3a where the radially inner end of the electron beam weld zone is located radially inwardly of the centering face 142, but radially outwardly of the inner peripheral face 147.

With respect to fabrication of the diaphragm disks from identical diaphragm disk blanks, it should be noted that, in addition to the advantages already mentioned, the use of essentially the same devices in the same numerical control programs for the fabrication of the diaphragm area which is resilient in bending is made possible.

It will thus be seen that the present invention provides for the production of a connection between a pair of diaphragm disks of a diaphragm disk assembly in a torque transmitting device or elastic coupling which is maintained so as to be relatively unsusceptible to imbalances and which is satisfactory insofar as its strength is concerned. In the invention, the contact face, between the radially outer edge areas of the diaphragm disks, which contact faces are at right angles to the axis of the joint, are connected with each other by an annular disk-shaped electron beam welding zone which extends from the radially outer periphery of the diaphragm disks radially inwardly up to a pairing of essentially cylindrical centering faces or which end within the material of the diaphragm disk comprising the radially outer centering face.

As a result of the arrangement of the present invention, a connection may be provided between the outer radial edge areas of the diaphragm disks in spite of the considerable investment costs of an electron beam welding device and the invention enables the connection to be produced easier and faster and with a more favorable cost consideration than connections by means of bolts. The balancing problem does not present any particular difficulties and if balancing is at all required, then this can be accomplished by turning the radially outer circumferential faces of the diaphragms on a lathe. This is also a significant advantage compared to a welded connection as disclosed in British Pat. No. 1 091 121. In such a welding connection, with a circularly extending welding seam on the peripheral faces of the edge parts abutting each other, first of all, an imbalance can be created by the application of the welding seam, and, secondly, the removal of such an imbalance by turning on a lathe is at least narrowly limited because through the turning operation, the welding seam acting as a connection would be removed or weakened.

With the type of connection proposed by the present invention, there will be resistance developed to the occurring stresses because notch effects are avoided at the connecting point in that the annularly disk-shaped electron beam welding zone reaches either up to the outer radial centering face of the one diaphragm disk or ends within the material of the diaphragm disk comprising the outer radial centering face. Besides avoiding notch effects, the advantage is achieved that the inner radial boundary of the annularly disk-shaped electron beam welding zone lies at the centering faces of the diaphragm disks or within the material of the one diaphragm disk with the outer radial centering face, so that no welding seams can be generated in the cavity between the diaphragm disks which would be inaccessible for any machining for the purposes of removing an imbalance.

Because the annular disk-shaped electron beam welding zone with its radially inner edge lies at the diaphragm disks or within the material of the diaphragm disk comprising the outwardly facing radial centering face, it is avoided that a depression results at the outer peripheral face of the diaphragm disks during the welding operation. Such depression would make any machining for balancing very difficult. In actual fact, more likely, a torus results rising slightly above the peripheral face which can be removed for the purpose of the balancing operation without the strength of the welding seam being jeopardized in its entirety.

The contact faces and the centering faces can be parts of a Z-shaped butt joint when viewed in cross-section containing the axis between the outer radial edge areas of the diaphragm disks. The step-shaped design of the outer edge areas of both diaphragm disks for obtaining the Z-shaped butt joint can be produced in a simple manner on conventional lathes. The Z-shaped butt joint allows an exact centering of the diaphragm disks relative to each other which, from the initial formation of the assembly, operates to diminish balancing problems.

Diaphragm disks can, in their outer radial edge areas, comprise annular projections axially oriented toward each other with the contact faces and the centering faces. These annular projections also insure in the case of a very thin-walled central radial area of the diaphragm disks that for the fabrication of the connection, there is sufficient material available at the outer radial rim.

The two diaphragm disks can be formed from identical diaphragm disk blanks which are machined in the outer radial edge areas for formation of the contact faces and the centering faces. Naturally, the machining of associated diaphragm disks must take into account the complementary shape for formation of a Z-shaped butt joint. However, the availability of identical diaphragm disk blanks for two associated diaphragm disks is already an advantageous feature from the point of view of storekeeping of parts and costs.

The front faces of the disks remote from each other are preferably manufactured, at least in the outer radial edge areas and in the middle radial areas, so as to be flat and normal to the axis. Thus, there exists the possibility to support these front faces at the equally planar support faces of lathe disks and then to perform the metal cutting machinery for formation of the contact faces, the centering faces and possibly also the recesses for the wall thickness reduction and the middle radial area, and, thus, to achieve the required elastic or resilient behavior. This is essential and important because, with insuffficient support, there would exist the danger of elastic deformation of the diaphragm disk during the metal cutting operations.

The diaphragm disks can also be connected in their inner radial edge areas in a manner known in itself with joint parts by means of electron beam welding.

The diaphragm disk assembly of the invention can be utilized in most differing forms of torque transmission devices. In accordance with the first preferred embodiment of the invention, two of the diaphragm disks of the disk pair are connected on the sides thereof facing each other at their inner radial edge areas with a connecting shaft, such as the shaft 10, which may be a torsion-elastic and/or bending-elastic shaft and which may possibly be divided into parts, as shown in FIG. 4. The disks having faces remote from each other, in at least one case, are provided, respectively, with a shaft joint flange, such as the flange 16.

A torque transmitting device or joint of this type is suitable for compensation of angular alignment errors and axial offset of rotating machine parts which have to be connected with each other. The shaft joint flange can exhibit a tubular prolongation which protrudes into the connecting shaft. It can be assured by this measure that, in the case of fracture, possibly in the diaphragm disk pair, the connecting shaft will remain secured in its position by means of the tubular prolongation.

In another of the preferred embodiments of a torque transmission joint in accordance with the present invention, the diaphragm disks having faces facing each other of the two diaphragm disk pairs aligned with each other are connected with each other at their inner radial edge areas by means of a connecting shaft which may be divided into parts and which may particularly be torsion-elastic and/or bending-elastic, while at least one of the diaphragm disks having faces remote from each other is provided with one connecting shaft hub which protrudes into the connecting shaft. The particular advantage of this embodiment of the torque transmitting joint lies in that the shafts of the associated machine parts which are to be connected with each other can be positioned with the closest spacing relative to each other and, in spite of that, a torque transmitting device is created btween the shafts which has a sufficient ability for compensating for angular alignment errors and axial offset.

The invention is further related to a process for the fabrication of the pairs of diaphragm disks.

In the process in accordance with the invention, initially, the contact faces 121, 141 and the centering faces 122, 142 are formed on the two diaphragm disk blanks and then the centering faces are moved into sliding engagement with each other until contact of the contact faces is established. The contact faces 121, 141 are then welded together with a radially oriented electron beam which executes a motion relative to the diaphragm disk pair around their axis and its intensity and/or the electronic acceleration is adjusted in such a way that it penetrates between the contact faces up to the outwardly facing radial centering face 142 or further into the material of the diaphragm disks comprising the outer radial centering face 142 without however completely penetrating through this material.

In this process, it is advisable in view of the electron beam welding process that there be provided a transition curve with a radius of less than 0.2 mm at the transition 143 between the radially outwardly facing centering face 142 and the associated contact face 141 and that the transitional edge between the inwardly facing radial centering face 122 and the associated contact face 121 be bevelled or chamfered as at 123 in such a way that, when the centering faces are brought together, the contact faces 121 and 141 will come to rest against each other with their full surface while minimizing the cavity between the transition curve and the bevelled edge 143, 123. This feature prevents formation of an air space of larger volume in the welding area which could impede the electron beam welding process which must be performed in a vacuum.

In a preferred method for the fabrication of the diaphragm disk for the diaphragm disk assembly of the invention, it is provided, first of all, that at least in the radially outer edge area and in the radially central area of a disk blank, a front face is fashioned and that this blank is then applied with its flat front face to a support surface of a lathe disk so that a recess may then be fashioned in the radially central area of the surface remote from the flat front face, whereby, in the radially outer area, an axially oriented annular projection remains standing, and so that, finally, a contact face as well as a centering face is fashioned at this annular projection. In such a manner, diaphragm disks of small wall thickness and thus of high elastic deformability can be provided while, at the same time, machining of the surfaces can be accomplished without impeding springiness.

Because of the reasons already discussed previously herein, it is advisable to fabricate the diaphragm disks of the pairs belonging together from identical disk blanks so that only the chip-removing final machining must be performed in a differing manner, while the disk blanks themselves can be readily produced and stored.

The diaphragm disk pairings of the invention can be fashioned as complete components and connected as such with the connecting parts. This is a preferred approach because, in this manner, relatively small components must be worked upon on the electron beam welding apparatus.

It is, however, also possible that the diaphragm disks of the pairs are connected, first of all, with the connecting parts and subsequently welded together with each other. In order to remove any imbalance which may exist, the common peripheral surface of the diaphragm disks connected with each other can be subjected to machining after being welded, particularly by being turned on a lathe.

The diaphragm disk pairs or assembly of the invention supply flexible couplings which are increasingly required particularly in high rpm drives and indeed because of general requirements, such as vibration-free power transmission, provide longer service life and absolute maintenance freedom. The flexible diaphragm couplings satisfy these requirements comprehensively because of their specific design characteristics. They will have a low weight characteristic in view of the allsteel design and they can be balanced as a coupling in a completely assembled state. Furthermore, they will be free from wear and do not require lubrication. Where the power supply and the driven aggregate are at a greater distance from each other, it is possible to use two diaphragm couplings, while forming a double universal joint coupling. Thus, compensation may also be achieved with larger shaft misalignments. In addition, the restoring forces are reduced, and, thus, the resulting unfavorable effects upon the bearings of the connecting shafts are minimized.

While specific embodiments of the invention have been shown and described in detail to illustrate the application of the inventive principles, it will be understood that the invention may be embodied otherwise without departing from such principles.

What is claimed is:

1. A torque transmission unit comprising a first joint part (16) and a second joint part (10) defining an axis and interconnected by a diaphragm disk assembly (12, 14), said diaphgram disk assembly (12, 14) comprising a pair of adjoining concentric diaphragm disks (12, 14), each of said diaphragm disks (12, 14) having an annular radially outer edge area (a), an annular radially inner edge area (i) and an annular radially middle area (m) extending between said outer and inner edges areas (a, i), said middle areas having a radial dimension greater than the radial dimensions of said outer and inner edge areas, said diaphragm disks having radially extending oppositely directed front faces in said middle areas and outer edges areas with said front faces being planar and extending perpendicularly to the axis of said second joint part, said front faces being imperforate and free of support external of said diaphragram disks, said diaphragm disk (12, 14) being connected adjacent respective radially inner peripheries each to a different one of said first (16) and said second (10) joint parts in said radially inner areas and being connected to each other adjacent respective radially outer peripheries in said outer edge areas, said diaphragm disks (12, 14) being provided adjacent their radially outer peripheries in said outer edge areas with axially directed annular projections facing oppositely to said front faces and directed towards each other, the annular projection of a first said diaphragm disk (12) being provided with a radially inner axially directed base face (124) and a radially outer axially directed annular extension, the axial projection of a second said diaphgram disk (14) being provided with a radially outer axially directed base face (141) spaced radially outwardly from said base face (124) of said first diaphgram disk and a radially inner axially directed annular extension, said radially inner annular extension being located radially inwards of and located opposite said radially outer annular extension, a Z-shaped butt joint being defined between said annular extensions and base faces, a radially outer zone of said Z-shaped butt joint being defined by an axially directed end face (121) of said radially outer annular extension and said radially outer base face (141), a radial intermediate zone of said Z-shaped butt joint being defined between a radially inwardly directed circumferential centering face (122) of said radially outer annular extension and a radially outwardly directed circumferential centering face (142) of said radially inner annular extension and a radially inner butt joint zone of said Z-shaped butt joint being defined by said radially inner base face (124) and an axially directed end face (144) of said radially inner extension, an annular disk-shaped electron beam welding zone (20) being provided in said radially outer butt joint zone extending radially inwardly from radially outermost circumferentially faces (128, 148) of said first and second diaphgragm disks to said radially outwardly directed circumferential centering face (142) for connecting said end face (121) of said radially outer annular extension and said radially outer base face (141), and the radial dimension of said welding zone (20) corresponding at least to the radial dimension of said outer based face (141) and being greater than the radial dimension of said radially inner annulur extension.

2. A torque transmission unit comprising a first joint part (16) and a second joint part (10) defining an axis and interconnected by a diaphrgam disk assembly (12, 14), said diaphgram disk assembly (12, 14) comprising a pair of adjoining concentric diaphgragm disks (12, 14), each of said diaphgram disks (12, 14) having an annular radially outer edge area (a), an annular radially inner edge area (i) and an annular radially middle area (m) extending between said outer and inner edges areas (a, i), said middle areas having a radial dimension greater than the radial dimensions of said outer and inner edge areas, said diaphragm disks having radially extending oppositely directed front faces in said middle areas and outer edges areas with said front faces being planar and extending perpendicularly to the axis of said second joint part, said front faces being imperforate and free of support external of said diaphragm disks, said diaphgram disks (12, 14) being connected adjacent respective radially inner peripheries each to a different one of said first (16) and said second (10) joint parts in said radially inner areas and being connected to each other adjacent respective radially outer peripheries in said outer edge areas, said diaphgram disks (12, 14) being provided adjacent their radially outer peripheries in said outer edge areas with axially directed annular projections facing oppositely to said front faces and directed towards each other, the annular projection of a first said diaphragm disk (12) being provided with a radially inner axially directed base face (124) and a radially outer axially directed annular extension, the axial projection of a second said diaphgram disk (14) being provided with a radially outer axially directed base face (141) spaced radially outwardly from said base face (124) of said first diaphgram disk and a radially inner axially directed annular extension, said radially inner annular extension being located radially inwards of and located opposite said radially outer annular extension, a Z-shaped butt joint being defined between said annular extensions and base faces, a radially outer zone of said Z-shaped butt joint being defined by an axially directed end face (121) of said radially outer annular extension and said radially outer base face (141), a radial intermediate zone of said Z-shaped butt joint being defined between a radially inwardly directed circumferential centering face (122) of said radially outer annular extension and a radially outwardly directed circumferential centering face (142) of said radially inner annular extension and a radially inner butt joint zone of said Z-shaped butt joint being defined by said radially inner base face (124) and an axially directed end face (144) of said radially inner extension, an annular disk-shaped electron beam welding zone (20) being provided in said radially outer butt joint zone extending radially inwardly from radially outermost circumferential faces (128, 148) of said first and second diaphgram disks to said radially outwardly directed circumferential centering face (142) for connecting said end face (121) of said radially outer annular extension and said radially outer base face (141), and the radial dimension of said welding zone (20) being greater than the radial dimension of said outer base face (141) dimension of said outer base face (141) and being greater than the radial dimension of said radially inner annular extension.

3. A torque transmission unit comprising a first joint part (16) and a second joint part defining an axis and interconnected by two diaphgram disk assemblies each said diaphgram disk assembly comprising a pair of adjoining concentric diaphragm disks (12, 14), each of said diaphragm disks (12, 14) having an annular radially outer edge area (a), an annular radially inner edge area (i) an and annular radially middle area (m) extending between said outer and inner edge areas (a, i), said middle areas having a radial dimension greater than the radial dimensions of said outer and inner edge areas, said diaphragm disks having radially extending oppositely directed front faces in said middle areas and outer edge areas with said front faces being planar and extending perpendicularly to the axis of said second joint part, said front faces being imperforate and free of support external of said diaphgram disks, one diaphgram disk (12) of each pair (12, 14) being connected adjacent a respective radially inner periphery in said radially inner area to one of said first (16) and said second joint part, respectively, another diaphragm disk (14) of each diaphragm disk assembly (12, 14) being connected adjacent a respective inner periphery in said radially inner area to an interconnecting shaft (10), the diaphragm disks (12, 14) of each pair being connected to each other adjacent respective radially outer peripheries in said outer edge areas, said diaphragm disks of each pair being provided at their radially outer peripheries in said outer edge areas with axially directed annular projections facing oppositely to said front faces and directed towards each other, the annular projection of a first said diaphragm disk (12) being provided with a radially inner axially directed base face (124) and a radially outer axially directed annular extension, the axial projection of a second diaphragm disk (14) being provided with a radially outer axially directed base face (141) spaced radially outwardly from said base face of said first diaphragm disk and a radially inner axially directed annular extension, said radially inner annular extension being located radially inwards of and oppposite said radially outer annular extension, a Z-shaped butt joint being defined between said annular extensions and base faces, a radially outer zone of said Z-shaped butt joint being defined of an axially directed end face (121) of said radially outer annular extension and said radially outer has face (141), a radial intermediate zone of said Z-shaped butt joint being defined between a radially inwardly directed circumferential centering face (122) of said radially outer annular extension and a radially outwardly directed circumferential centering face (142) of said radially inner annular extension and a radially inner butt joint zone of said Z-shaped butt joint being defined by said radially inner base face (124) and an axially directed end face (144) of said radially inner extension, an annular disk-shaped electron beam welding zone (20) being provided in said radially outer butt joint zone extending radially inwardly from radially outermost circumferential faces (128, 148) of said first and seocnd diaphgram disks to said radially outwardly directed circumferential centering face (142) for connecting said end face (121) of said radially outer annular extension and said radially outer base face (141), and the radial dimension of said welding zone (20) corresponding at least to the radial dimension of said outer base face (141) and being greater than the radial dimension of said radially inner annular extension.

4. A torque transmission unit comprising a first joint part (16) and a second joint part defining an axis and interconnected by two diaphragm disk assemblies, each said diaphragm disk assembly comprising a pair of adjoining concentric diaphragm disks (12, 14), each of said diaphragm disks (12, 14) having an annular radially outer edge area (a), an annular radially inner edge area (i) and an annular radially middle area (m) extending between said outer and inner edges areas (a, i), said middle areas having a radial dimension greater than the radial dimensions of said outer and inner edge areas, said diaphragm disks having radially extending oppositely directed front faces in said middle areas and outer edges areas with said front faces being planar and extending perpendicularly to the axis of said second joint part, said front faces being imperforate and free of support external of said diaphragm disks, one diaphragm disk (12) of each pair (12, 14) being connected adjacent a respective radially inner periphery in said radially inner area to one of said first (16) and said second joint part, respectively, another diaphragm disk (14) of each diaphragm disk assembly (12, 14) being connected adjacent a respective inner periphery in said radially inner area to an interconnecting shaft (10), the diaphragm disks (12, 14) of each pair being connected to each other adjacent respective radially outer peripheries in said outer edge areas, said diaphgram disks of each pair being provided at their radially outer peripheries in said outer edge areas with axially directed annular projections facing oppositely to said front faces and directed towards each other, the annular projection of a first said diaphragm disk (12) being provided with a radially inner axially directed base face (124) and a radially outer axially directed annular extension, the axial projection of a second said diaphgram disk (14) being provided with a radially outer axially directed base face (141) spaced radially outwardly from said base face of said first diaphragm disk and a radially inner axially directed annular extension, said radially inner annular extension being located radially inwards of and opposite said radially outer annular extension, a Z-shaped butt joint being defined between said annular extensions and base faces, a radially outer zone of said Z-shaped butt joint being defined by an axially directed end face (121) of said radially outer annular extension and said radially outer base face (141), a radial intermediate zone of said Z-shaped butt joint being defined between a radially inwardly directed circumferential centering face (122) of said radially outer annular extension and a radially outwardly directed circumferential centering face (142) of said radially inner annular extension and a radially inner butt joint zone of said Z-shaped butt joint being defined by said radially inner base face (124) and an axially directed end face (144) of said radially inner extension, an annular disk-shaped electron beam welding zone (20) being provided in said radially outerbutt joint zone extending radially inwardly from radially outermost circumferential faces (128, 148) of said first and second diaphragm disks to said radially outwardly directed circumferential centering face (142) for connecting said end face (121) of said radially outer annular extension and said radially outer base face (141), and the radial dimension of said welding zone (20) being greater than the radial dimension of said outer base face (141) and being greater than the radial dimension of said radially inner annular extension.

5. A torque transmission unit comprising a first joint part (16) and a second joint part defining an axis interconnected by two diaphragm disk assemblies, each said diaphragm disk assembly comprising a pair of adjoining concentric diaphragm disks (12, 14), each of said diaphragm disks (12, 14) having an annular radially outer edge area (a), an annular radially inner edge area (i) and an annular radially middle area (m) extending between said outer and inner edges areas (a, i), said middle areas having a radial dimension greater than the radial dimensions of said outer and inner edge areas, said diaphragm disks having radially extending oppositely directed front faces in said middle areas and outer edges areas with said front faces being planar and extending perpendicularly to the axis of said second joint part, said front faces being imperforate and free of support external of said diaphragm disks, one diaphragm disk (12) of each pair (12, 14) being connected adjacent a respective radially inner periphery in said radially inner area to one of said first (16) and said second joint part, respectively, another diaphragm disk (14) of each diaphragm disk assembly (12, 14) being connected adjacent a respective inner periphery in said radially inner area to an interconnecting shaft (10), the diaphragm disks (12, 14) of each pair being connected to each other adjacent respective radially outer peripheries in said outer edge areas said diaphragm disks of each pair being provided at their radially outer peripheries in said outer edge areas with axially directed annular projections facing oppositely to said front faces and directed towards each other, the annular projection of a first said diaphragm disk (12) being provided with a radially inner axially directed base face (124) and a radially outer axially directed annular extension, the axial projection of a second said diaphragm disk (14) being provided with a radially outer axially directed base face (141) spaced radially outwardly from said base face of said first diaphragm disk and a radially inner axially directed annular extension, said radially inner annular extension being located radially inwards of and opposite said radially outer annular extension, a Z-shaped butt joint being defined between said annular extensions and base faces, a radially outer zone of said Z-shaped butt joint being defined by an axially directed end face (121) of said radially outer annular extension and said radially outer base face (141), a radial intermediate zone of said Z-shaped butt joint being defined between a radially inwardly directed circumferential centering face (122) of said radially outer annular extension and a radially outwardly directed circumferential centering face (142) of said radially inner annular extension and a radially inner butt joint zone of said Z-shaped butt joint being defined by said radially inner base face (124) and an axially directed end face (144) of said radially inner extension, an annular disk-shaped electron beam welding zone (20) being provided in said radially outer butt joint zone extending radially inwardly from radially outermost circumferential faces (128, 148) of said first and second diaphragm disks to said radially outwardly directed circumferential centering face (142) for connecting said end face (121) of said radially outer annular extension and said radially outer base face (141), and the radial dimension of said welding zone (20) corresponding at least to the radial dimension of said outer base face (141) and being greater than the radial dimension of said radially inner annular extension, said first and second joint parts (16) being provided with respective hub portions (18) which extend into said interconnecting shaft (10).

6. A torque transmission unit comprising a first joint part (16) and a second joint part defining an axis an interconnected by two diaphragm disk assemblies, each said diaphragm disk assembly comprising a pair of adjoining concentric diaphragm disk (12, 14), each of said diaphragm disks (12, 14) having an annular radially outer edge area (a), an annular radially inner edge area (i) and an annular radially middle area (m) extending between said outer and inner edge areas (a, i), said middle areas having a radial dimension greater than the radial dimensions of said outer and inner edge areas, said diaphragm disks having radially extending oppositely directed front faces in said middle areas and outer edge areas with said front faces being planar and extending perpendicularly to the axis of said second joint part, said front faces being imperforate and free of support external of said diaphragm disks, one diaphragm disk (12) of each pair (12, 14) being connected adjacent a respective radially inner periphery in said radially inner area to one of said first (16) and said second joint part, respectively, another diaphragm disk (14) of each diaphragm disk assembly (12, 14) being connected adjacent a respective inner periphery in said radially inner area to an interconnecting shaft (10), the diaphragm disks (12, 14) of each pair being connected to each other adjacent respective radially outer peripheries in said outer edge areas said diaphragm disks of each pair being provided at their radially outer peripheries in said outer edge areas with axially directed annular projections facing oppositely to said front faces and directed towards each other, the annular projection of a first said diaphragm disk (12) being provided with a radially inner axially directed base face (124) and a radially outer axially directed annular extension, the axial projection of a second said diaphragm disk (14) being provided with a radially outer axially directed base (141) spaced radially outwardly from said base face of said first diaphragm disk and a radially inner axially directed annular extension, said radially inner annular extension being located radially inwards of and opposite said radially outer annular extension, a Z-shaped butt joint being defined between said annular extensions and base faces, a radially outer zone of said Z-shaped butt joint being defined by an axially directed end face (121) of said radially outer annular extension and said radially outer base face (141), a radial intermediate zone of said Z-shaped butt joint being defined between a radially inwardly directed circumferential centering face (122) of said radially outer annular extension and a radially outwardly directed circumferential centering face (142) of said radially inner annular extension and a radially inner butt joint zone of said Z-shaped butt joint being defined by said radially inner base face (124) and an axially directed end face (144) of said radially inner extension, an annular disk-shaped electron beam welding zone (20) being provided in said radially outer butt joint zone extending radially inwardly from radially outermost circumferential faces (128, 148) of said first and second diaphragm disks to said radially outwardly directed circumferential centering face (142) for connecting said end face (121) of said radially outer annular extension and said radially outer base face (141), and the radial dimension of said welding zone (20) being greater than the radial dimension of said outer base face (141) and being greater than the radial dimension of said radially inner annular extension, said first and second joint parts (16) being provided with respective hub portions (18) which extend into said interconnecting shaft (10).

7. An assembly according to claim 1,2,3,4,5 or 6, wherein said pair of diaphragm disks are formed from identical diaphragm disk blanks which are machined in their radially outer edge areas to form therein said contact faces and said centering faces.

8. An assembly according to claim 1, 2, 3, 4, 5 or 6, wherein said diaphragm disks are connected of said joint parts at said radially inner areas of said disks by means of electron beam welding.

9. A joint according to claim 3 or 4, wherein said connecting shaft comprises a plurality of parts.

10. A joint according to claim 3 or 4, wherein said shaft joint flange comprises a tube extension protruding inwardly into said connecting shaft.

* * * * *